(12) United States Patent
Altenburger et al.

(10) Patent No.: US 10,388,921 B2
(45) Date of Patent: Aug. 20, 2019

(54) LATCHING MECHANISM FOR A BATTERY PACK

(71) Applicant: AC (Macao Commercial Offshore) Limited, Macau (MO)

(72) Inventors: Ryan Altenburger, Greenville, SC (US); Brent Gregorich, Anderson, SC (US); Michael Buckner, Clemson, SC (US)

(73) Assignee: TTI (MACAO COMMERCIAL OFFSHORE) LIMITED, Macau (MO)

( * ) Notice: Subject to any disclaimer, the term of this patent is extended or adjusted under 35 U.S.C. 154(b) by 500 days.

(21) Appl. No.: 15/213,516

(22) Filed: Jul. 19, 2016

(65) Prior Publication Data
US 2017/0025650 A1    Jan. 26, 2017

Related U.S. Application Data

(60) Provisional application No. 62/195,667, filed on Jul. 22, 2015.

(51) Int. Cl.
| | |
|---|---|
| *H01M 10/0525* | (2010.01) |
| *H01M 2/10* | (2006.01) |
| *B25F 5/02* | (2006.01) |

(52) U.S. Cl.
CPC ............ *H01M 2/1022* (2013.01); *B25F 5/02* (2013.01); *H01M 10/0525* (2013.01); *H01M 2220/30* (2013.01)

(58) Field of Classification Search
None
See application file for complete search history.

(56) References Cited

U.S. PATENT DOCUMENTS

| | | | |
|---|---|---|---|
| 3,999,110 | A | 12/1976 | Ramstrom et al. |
| 4,447,749 | A | 5/1984 | Reeb, Jr. et al. |
| 5,553,675 | A | 9/1996 | Pitzen et al. |
| 6,168,881 | B1 | 1/2001 | Fischer et al. |
| 6,313,611 | B1 | 11/2001 | Mowry et al. |
| 6,562,509 | B1 | 5/2003 | Eggert |
| 6,729,413 | B2 | 5/2004 | Turner et al. |
| 7,243,734 | B2 | 7/2007 | Wu |
| 7,455,544 | B2 | 11/2008 | Glauning et al. |
| 7,554,287 | B2 | 6/2009 | Dusselberg |

(Continued)

FOREIGN PATENT DOCUMENTS

| | | |
|---|---|---|
| CA | 1187598 | 5/1985 |
| CA | 2602930 | 3/2008 |
| WO | 2014049926 | 4/2014 |

*Primary Examiner* — Haroon S. Sheikh
(74) *Attorney, Agent, or Firm* — Michael Best & Friedrich LLP

(57) ABSTRACT

A power tool assembly includes a power tool having a battery support portion that defines a battery insertion axis and a battery operatively engageable with the power tool support portion along the battery insertion axis to provide power to the power tool. The power tool assembly also includes a battery latching mechanism having a latch pivotable about a pivot axis transverse to the battery insertion axis and engageable with one of the battery pack or the battery support portion for securing the battery pack to the battery support portion. The battery latching mechanism further includes a handle coupled for pivoting movement with the latch about the pivot axis.

19 Claims, 4 Drawing Sheets

(56) References Cited

U.S. PATENT DOCUMENTS

| | | |
|---|---|---|
| 7,766,097 B2 | 8/2010 | Kondo |
| 8,228,029 B2 | 7/2012 | Meyer et al. |
| 8,237,404 B2 | 8/2012 | Takano et al. |
| 8,354,183 B2 | 1/2013 | Konuma et al. |
| 8,632,525 B2 | 1/2014 | Kerr et al. |
| 2003/0039880 A1* | 2/2003 | Turner ............... H01M 2/1022 429/97 |
| 2007/0090700 A1* | 4/2007 | Matthias ............ H01M 2/1022 310/50 |
| 2012/0256590 A1 | 10/2012 | Hamano et al. |
| 2013/0031762 A1 | 2/2013 | Chellew et al. |
| 2013/0330589 A1 | 12/2013 | Detry et al. |
| 2014/0147718 A1 | 5/2014 | Furui et al. |
| 2014/0161513 A1 | 6/2014 | Chellew et al. |
| 2015/0054447 A1* | 2/2015 | Suzuki ............... H01M 2/1055 320/103 |
| 2015/0196363 A1* | 7/2015 | Aman ...................... B25F 5/02 53/425 |

\* cited by examiner

LATCHING MECHANISM FOR A BATTERY PACK

CROSS-REFERENCE TO RELATED APPLICATIONS

This application claims priority to U.S. Provisional Patent Application No. 62/195,667 filed on Jul. 22, 2015, the entire content of which is incorporated herein by reference.

FIELD OF THE INVENTION

The invention relates to power tools, and more particularly to latching mechanisms for connecting battery packs to power tools.

SUMMARY OF THE INVENTION

The invention provides, in one aspect, a power tool assembly including a power tool having a battery support portion that defines a battery insertion axis and a battery pack that provides power to the power tool when operatively engaged with the battery support portion. The power tool assembly also includes a battery latching mechanism having a latch pivotable about a pivot axis transverse to the battery insertion axis and engageable with one of the battery pack or the battery support portion for securing the battery pack to the battery support portion. The battery latching mechanism also includes a handle coupled for pivoting movement with the latch about the pivot axis.

In another aspect, the invention provides a method for coupling a battery pack to a power tool including sliding the battery pack into engagement with a battery support portion of the power tool along a battery insertion axis. The method also includes engaging corresponding electrical contacts on the battery pack and the power tool, respectively. The method further includes pivoting a latch about a pivot axis oriented transverse to the battery insertion axis, thereby applying a clamping force to one of the battery pack or the battery support portion for securing the battery pack to the battery support portion.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
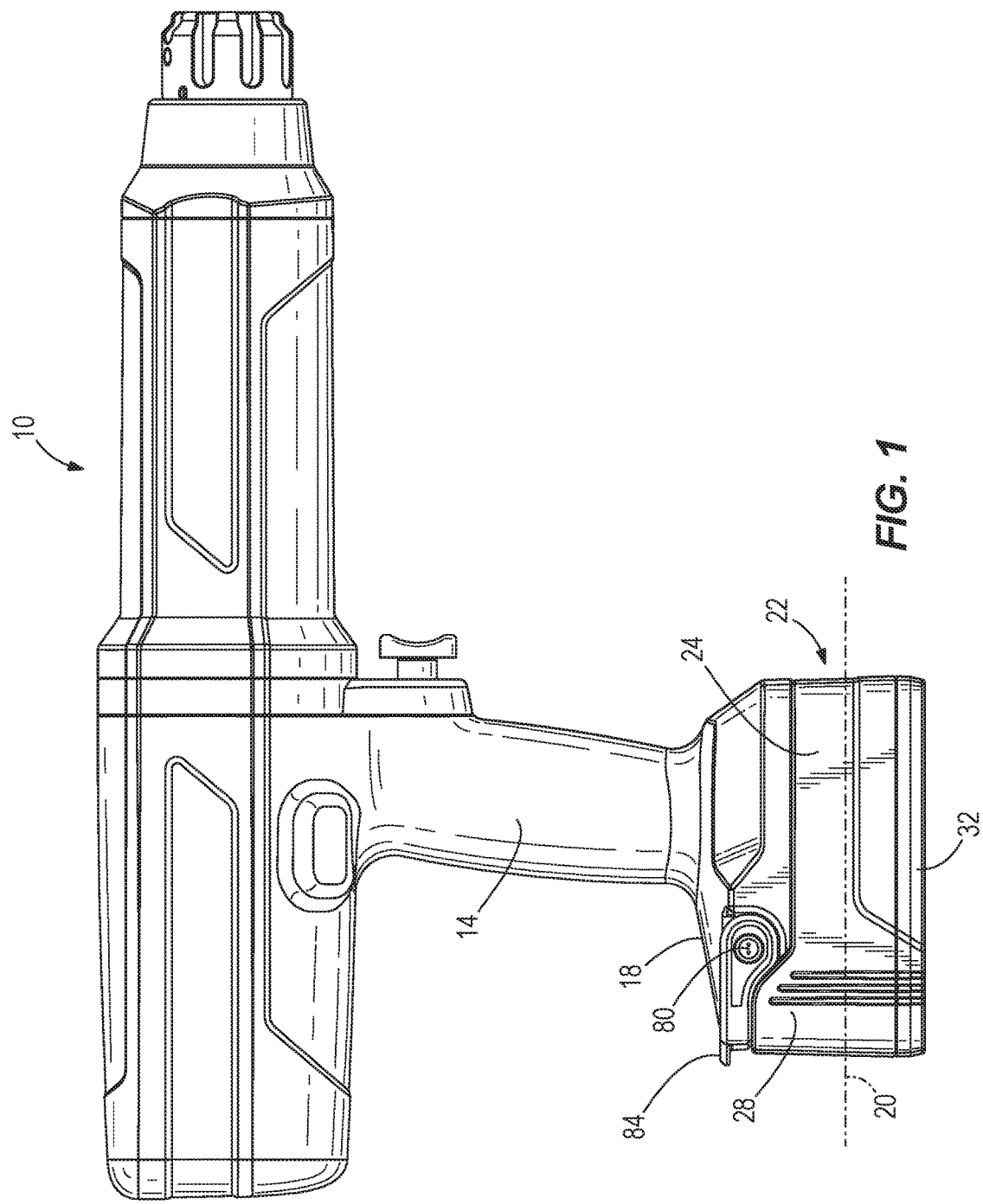
FIG. 1 is a plan view of a power tool coupled to a battery pack.

FIG. 1 illustrates a power tool 10, such as a medical impactor, including a housing 14 having a battery support portion 18 to which a battery pack 22, such as a medical grade lithium-ion power tool battery pack, is coupled. The battery pack 22 is a 'slide-on' battery pack, meaning attachment of the battery pack 22 to the tool 10 occurs along a battery insertion axis 20 that extends from front to back of the tool 10 (as shown in FIG. 1).

Figure 2:
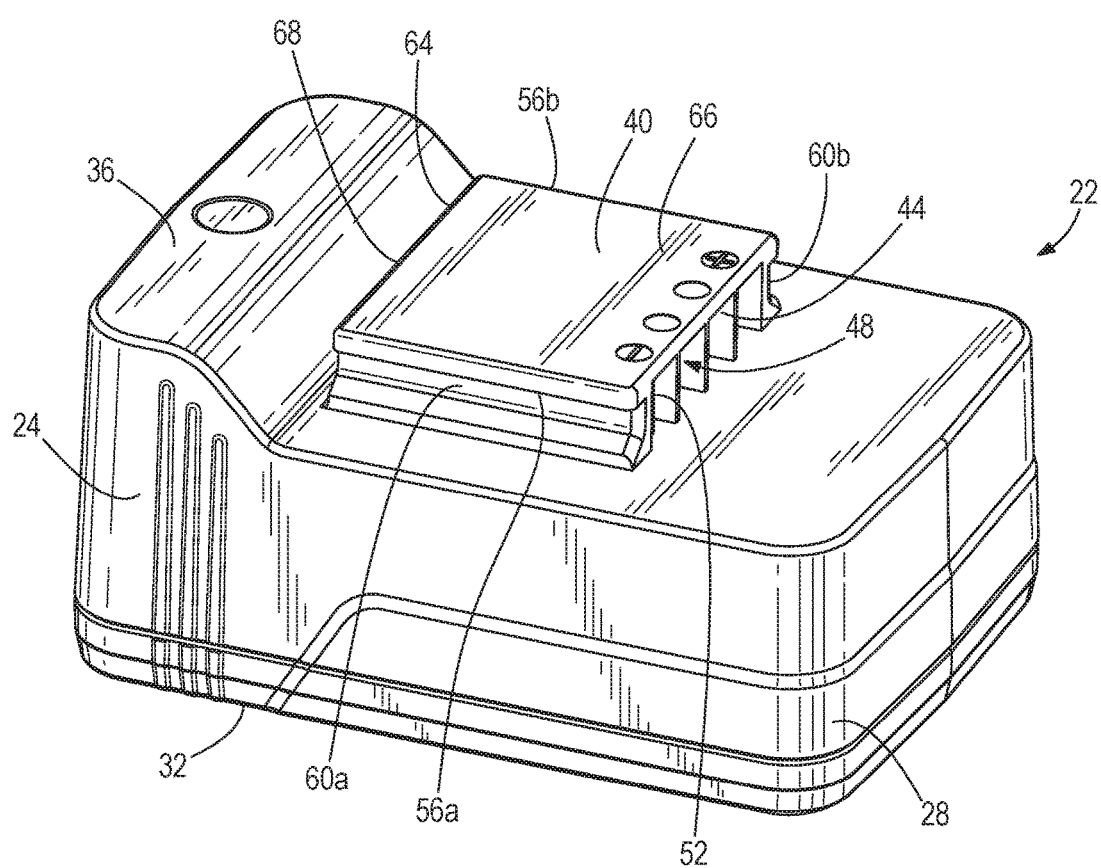
FIG. 2 is a perspective view of the battery pack of FIG. 1 detached from the power tool.
Figure 4:
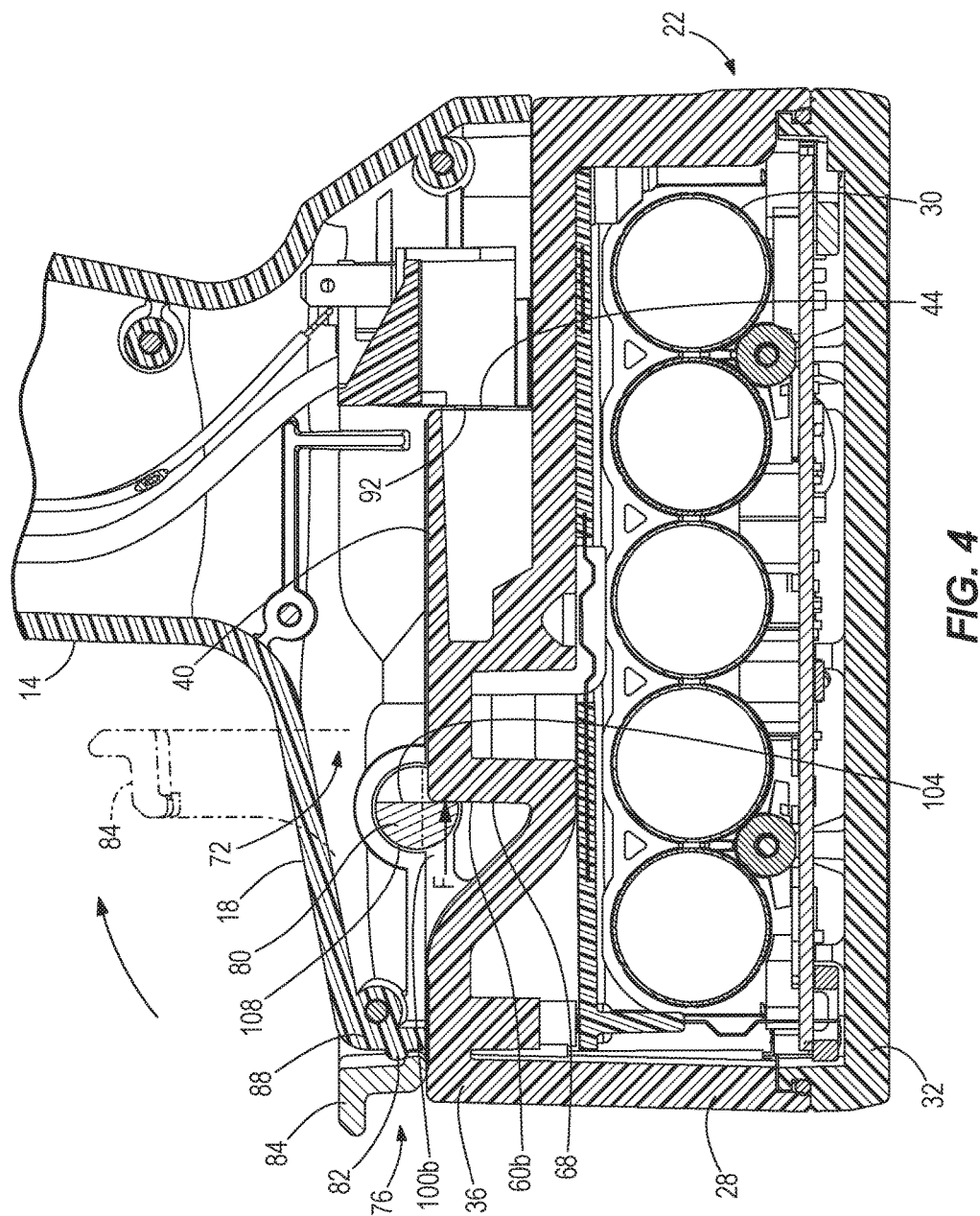
FIG. 4 is a cross-sectional view of the battery pack and power tool of FIG. 1.

FIG. 2 illustrates the battery pack 22 detached from the tool 10. The battery pack 22 includes an outer housing 24 having an upper portion 28 coupled to a lower portion 32 to define an interior volume supporting battery cells 30 (FIG. 4). The upper portion 28 of the outer housing 24 includes an elevated end 36 disposed on a rear section of the upper portion 28 and a protrusion 40 extending from a central portion of a top surface of the upper portion 28. The protrusion 40 includes a front end 44 having a plurality of apertures 48 exposing battery electrical contacts 52, a pair of lateral sides 56a, 56b defining therein, respectively, a pair of grooves 60a, 60b, a rear end 64 defining an engagement surface 68 oriented transverse to the battery insertion axis 20, and a top surface 66 extending between the front and rear ends 44, 64.

Figure 3:
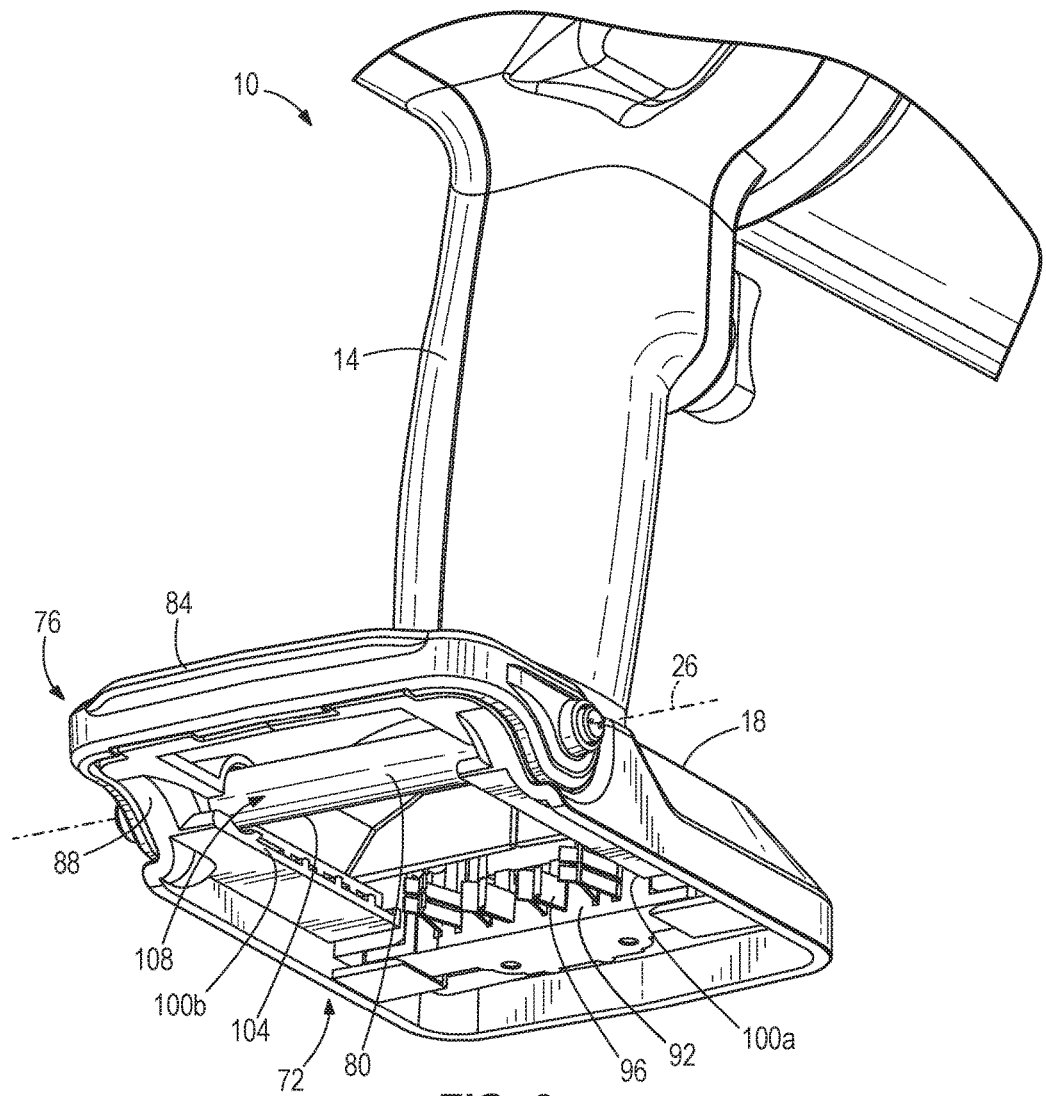
FIG. 3 is a bottom, rear perspective view of the power tool of FIG. 1 with the battery pack removed.

FIG. 3 illustrates the battery support portion 18 of the power tool 10. The battery support portion 18 defines a cavity 72 into which the protrusion 40 of the battery pack 22 is received. The battery support portion 18 includes a rear section 88 sized and shaped to receive the elevated end 36 of the battery pack 22 to form a sealed connection therewith, an end wall 92 from which tool electrical contacts 96 extend toward the rear of the cavity 72, and a pair of opposed rails 100a, 100b protruding inwardly from the respective lateral sides of the cavity 72. With reference to FIG. 4, when the battery pack 22 is attached to the battery support portion 18 of the housing 14, the front end 44 of the protrusion 40 is engaged with the end wall 92, and the rails 100a, 100b are slidably received within and engaged with the corresponding grooves 60a, 60b in the protrusion 40 of the battery pack 22.

The tool 10 also includes a battery latching mechanism 76 for clamping the battery pack 22 to the battery support portion 18. With reference to FIGS. 3 and 4, the latch mechanism 76 includes a latch 80 that is pivotable about a pivot axis 26 that is transverse to the battery insertion axis 20 and a U-shaped handle 84 that is coupled for pivoting movement with the latch 80 about the pivot axis 26. As shown in FIG. 3, the handle 84 extends about an outer periphery of the rear section 88 of the battery support portion 18, and the latch 80 is configured as a shall extending across the width of the cavity 72. With reference to FIG. 4, the latch 80 includes a flat locking surface 104 and an opposite, arcuate surface 108. Opposite ends of the latch 80 extend through the housing 14 and are coupled to, or optionally formed integrally with, the U-shaped handle 84.

With continued reference to FIG. 4, the handle 84 and latch 80 are pivotable relative to the battery support portion 18 about the pivot axis 26 in order to switch the latching mechanism 76 between a locked state and an unlocked state. In the locked state, as shown with solid lines in FIG. 4, the flat locking surface 104 of the latch 80 is oriented parallel with and engages the engagement surface 68 of the protrusion 40, thereby applying a nominal clamping force F thereto along a line of action parallel with the battery insertion axis 20 to maintain the front end 44 of the protrusion 40 in contact with the end wall 92 of the battery support portion 18, and to maintain the electrical connection between the battery electrical contacts 52 and the tool electrical contacts 96. The latching mechanism 76 also includes a detent 82 which, in the illustrated embodiment of the tool 10, is integrally formed with the battery support portion 18. As described in further detail below, the detent 82 maintains the handle 84 in the orientation shown in FIG. 4, therefore also maintaining the latching mechanism 76 in the locked state until acted upon by the user.

In the unlocked state of the latching mechanism 76 (shown in phantom lines in FIG. 4), the handle 84, and therefore the latch 80, are pivoted approximately 90 degrees in a clockwise direction from the frame of reference of FIG. 4 from the orientation of the handle 84 and latch 80 in the locked state. In this orientation of the latch 80, the flat locking surface 104 is disengaged from the engagement surface 68 of the protrusion 40 and oriented parallel with the top surface 66 of the protrusion 40, therefore removing the clamping force F from the protrusion 40. In the unlocked state of the latching mechanism 76, the flat locking surface 104 of the latch 80 is also oriented substantially transverse to the engagement surface 68, removing the latch 80 from the cavity 72 and creating a clearance between the latch 80 and the top surface 66 of the protrusion 40 to permit the battery pack 22 to be removed from the battery support portion 18.

As noted above, the battery pack 22 is a 'slide on' battery pack. To attach the battery pack 22 to the tool 10, the latching mechanism 76 must first be in the unlocked state (shown in phantom lines in FIG. 4). Then, the rails 100a, 100b are aligned with the respective grooves 60a, 60b, and the battery pack 22 is pushed in the direction of the insertion axis 20, causing the rails 100a, 100b to be slidably received within the grooves 60a, 60b, until the front end 44 of the protrusion 40 contacts the end wall 92. As the front end 44 of the protrusion 40 nears the end wall 92, the tool electrical contacts 96 engage the battery electrical contacts 52. Thereafter, the latching mechanism 76 is switched from the unlocked state to the locked state by pivoting the handle 84 about the axis 26 in a counter-clockwise direction from the frame of reference of FIG. 4. As the handle 84 is pivoted, the latch 80 progressively protrudes into the cavity 72, eventually contacting the engagement surface 68 of the protrusion 40 with the flat locking surface 104. As the handle 84 approaches the horizontal orientation shown with solid lines in FIG. 4, it slides or "snaps" over the detent 82 which, in turn, maintains the handle 84 in the horizontal orientation and the latching mechanism 76 in the locked state.

In the locked state as shown in FIG. 4, the flat locking surface 104 applies a nominal clamping force upon the protrusion 40 and effectively prevents removal of the battery pack 22 in a reverse direction along the insertion axis 20, therefore maintaining engagement of the electrical contacts 52, 96. Furthermore, engagement of the rails 100a, 100b and the grooves 60a, 60b prevents disconnection of the battery pack 22 from the battery support portion 18 in a direction transverse to both the battery insertion axis 20 and the pivot axis 26 (i.e., downward with respect to FIG. 4).

The battery pack 22 may be removed from the tool 10 using a reverse process as described above.

Various features of the invention are set forth in the following claims.

What is claimed is:

1. A power tool assembly comprising:
a power tool including a battery support portion that defines a battery insertion axis;
a battery pack that provides power to the power tool when operatively engaged with the battery support portion; and
a battery latching mechanism including
a latch pivotable about a pivot axis transverse to the battery insertion axis and engageable with one of the battery pack or the battery support portion for applying a clamping force, in a direction parallel with the battery insertion axis, between the battery pack and the battery support portion to secure the battery pack to the battery support portion, and
a handle coupled for pivoting movement with the latch about the pivot axis.

2. The power tool assembly of claim 1, wherein the battery latching mechanism is coupled to the power tool, and wherein the latch is engageable with the battery pack for securing the battery pack to the battery support portion.

3. The power tool assembly of claim 2, wherein the battery latching mechanism is coupled to the battery support portion of the power tool.

4. The power tool assembly of claim 2, wherein the battery pack includes a protrusion on a top surface thereof, and wherein the latch is engageable with the protrusion for securing the battery pack to the battery support portion.

5. The power tool assembly of claim 4, wherein the protrusion includes a plurality of apertures on a first end thereof, and wherein the battery pack includes a plurality of electrical contacts disposed within the apertures.

6. The power tool assembly of claim 5, wherein the power tool includes a plurality of electrical contacts corresponding to the electrical contacts of the battery pack, and wherein the power tool electrical contacts are positioned on the battery support portion.

7. The power tool assembly of claim 6, wherein the electrical contacts on the power tool and the battery pack, respectively, are oriented in a direction parallel with the battery insertion axis.

8. The power tool assembly of claim 5, wherein the protrusion includes an engagement surface on a second end thereof engageable by the latch to secure the battery pack to the battery support portion.

9. The power tool assembly of claim 8, wherein the engagement surface is oriented transverse to the battery insertion axis.

10. The power tool assembly of claim 9, wherein the latch includes a flat locking surface engageable with the engagement surface of the protrusion.

11. The power tool assembly of claim 10, wherein the latch is pivotable about the pivot axis between a first orientation in which the flat locking surface is parallel with a top surface of the protrusion extending between the first and second ends of the protrusion, and a second orientation in which the flat locking surface is parallel and engaged with the engagement surface of the protrusion.

12. The power tool assembly of claim 11, wherein the battery latching mechanism further comprises a detent for maintaining the handle in an orientation coinciding with the second orientation of the latch.

13. The power tool assembly of claim 12, wherein the detent is integrally formed with the battery support portion.

14. The power tool assembly of claim 4, wherein the battery support portion includes a rail that is engageable with a groove defined in the protrusion to prevent removal of the battery pack along an axis transverse to both the battery insertion axis and the pivot axis.

15. The power tool assembly of claim 1, wherein the battery pack is a lithium-ion battery pack.

16. The power tool assembly of claim 1, wherein the power tool is a medical impactor.

17. A method for coupling a battery pack to a power tool, the method comprising:

sliding the battery pack into engagement with a battery pack support portion of the power tool along a battery insertion axis;
engaging corresponding electrical contacts on the battery pack and the power tool, respectively; and
pivoting a latch about a pivot axis oriented transverse to the battery insertion axis, thereby applying a clamping force, in a direction parallel with the battery insertion axis, to one of the battery pack or the battery support portion for securing the battery pack to the battery support portion.

18. The method of claim 17, wherein pivoting the latch about the pivot axis includes pivoting a handle in unison with the latch about the pivot axis.

19. The method of claim 18, further comprising maintaining the latching mechanism in a locked state with a detent on the battery support portion.

\* \* \* \* \*